United States Patent

[11] 3,629,548

[72] Inventor Henry V. Rygiol
  16437 E. Janine, Whittier, Calif. 90603
[21] Appl. No. 107,332
[22] Filed Jan. 18, 1971
[45] Patented Dec. 21, 1971

[54] MULTIARC WELDING
  14 Claims, 2 Drawing Figs.
[52] U.S. Cl. ................................................ 219/131 R,
  307/34, 219/69 C
[51] Int. Cl. .................................................. B23k 9/10
[50] Field of Search .................................... 219/131 R,
  131 WR, 135, 69 C; 13/12; 307/31, 34

[56] References Cited
  UNITED STATES PATENTS
  3,536,817 10/1970 Carroll et al. .................. 13/12
  3,543,139 11/1970 Greene ........................... 307/34 X Primary Examiner—J. V. Truhe
Attorney—Edward D. O'Brian ABSTRACT: A plurality of welding arcs can be simultaneously powered by a single power supply employed to supply power to each of these arcs through separate welding circuits corresponding to each of these arcs. Each of the welding circuits involved is constructed so as to include a means for creating a voltage drop such as a resistor, a means for regulating current flow such as a transistor means, an electrode to be used in creating an arc and a voltage comparison means such as an operational amplifier for controlling the operation of the means for regulating current flow. The voltage comparison means means in each of the welding circuits is connected to a reference means for producing a reference voltage so as to operate to control the means for regulating current flow in accordance with the voltage at the reference means and at the means for creating a voltage drop.

INVENTOR
HENRY V. RYGIOL
BY
EDWARD D. O'BRIAN
ATTORNEY 3,629,548

MULTIARC WELDING

BACKGROUND OF THE INVENTION

It is frequently desirable or necessary to simultaneously weld utilizing a plurality of separate welding arcs. In the past when this was necessary or desirable, separate power supplies have been utilized with each of such arcs. This is because of difficulties in powering more than one welding arc off of a single power supply. Past efforts to accomplish this are not considered to have been successful. In general it may be stated that past efforts to do this have been unsuccessful because one arc will tend to be favored over other arcs desired.

It will be recognized that in essence this is an extreme oversimplification of the problem encountered in the past in supplying power to a plurality of welding arcs from a single power source. An understanding of the present invention does not require a detailed understanding of the problems that have been encountered in attempting to do this. These problems have necessitated the use of individual power supplies and associated individual arcs in simultaneous welding using a plurality of arcs. Obviously this is disadvantageous from a cost standpoint because it requires the use of a number of power supplies.

SUMMARY OF THE INVENTION

An objective of the present invention is to provide a new and improved method and apparatus for simultaneously operating a plurality of separate welding arcs off of a single power supply. The invention is also intended to provide a new and improved apparatus for this purpose which may be easily and conveniently constructed at a comparatively nominal cost utilizing existing known components, which apparatus may be easily and conveniently operated and which apparatus is capable of giving prolonged, effective and reliable service.

In accordance with this invention these objectives are achieved in a welding apparatus including a known power supply means connected to conventional ground by providing in such a structure a reference means for providing a reference voltage and a plurality of separate welding circuits extending generally parallel to one another in parallel between the terminals of the power supply. Each of these welding circuits includes a means for creating a voltage drop, a means for regulating current flow, a conventional electrode, such as is used in creating a welding arc, and a voltage comparison means for controlling the operation of the means for regulating current flow. In each welding circuit the voltage comparison means is used so as to detect the voltage across the means for creating a voltage drop and to compare it with the reference voltage in order to govern the operation of the means for regulating current flow so that the arcs created by these welding circuits operate independently of one another with the same or substantially the same current.

BRIEF DESCRIPTION OF THE DRAWINGS

The invention is best more fully explained with reference to the accompanying drawing in which.

Figure 1:
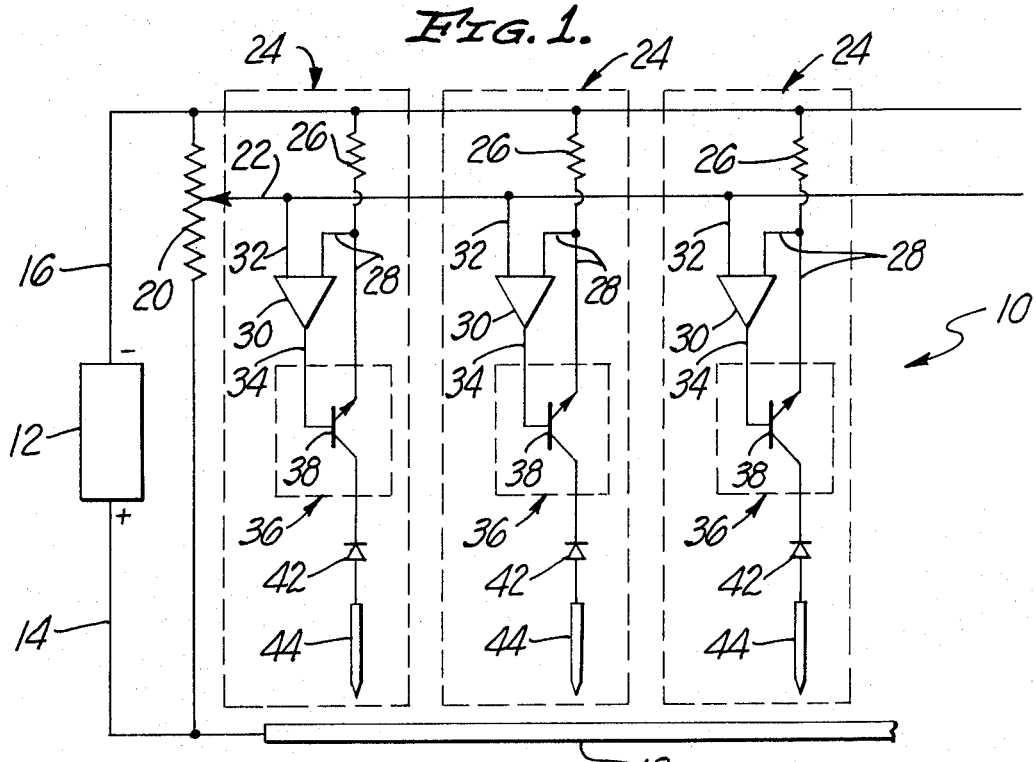
FIG. 1 is a schematic view of a presently preferred embodiment or form of a welding apparatus of the present invention used to supply comparatively low current in welding at each of a plurality of different welding arcs.

The essential features or principles of the invention indicated in the drawing and in the remainder of this specification can obviously be incorporated within many different types of equipment constructed in different ways in accordance with routine engineering skill. Similarly various changes may be made in the structure illustrated through the use or exercise or such skill without departing from the features or principles of this invention as set forth in the appended claims.

DETAILED DESCRIPTION OF THE PREFERRED EMBODIMENT

In FIG. 1 of the drawing there is shown a welding apparatus 10 in accordance with this invention which utilizes a conventional power supply 12 such as is commonly utilized for electric welding purposes. This power supply 12 has first and second positive and negative terminals 14 and 16, respectively. For convenience the leads connected to these terminals are designated by the same numbers as used to designate them. The first terminal 14 is connected to a ground 18. It is to be understood that in accordance with conventional practice this ground 18 is normally an item being welded through the use of the complete apparatus 10 and that the complete connection to it is made using conventional conductors, clamps, etc.

Within the apparatus 10 what may be regarded as a "voltage reference means" is provided across the terminals 14 and 16. This reference means in the preferred embodiment of the invention constitutes a simple adjustable potentiometer 20 which can be adjusted so as to provide a reference voltage as hereinafter indicated. Because the potentiometer 20 can be adjusted, such a reference voltage may be varied as described during the use of the apparatus 10. If desired for any reason the potentiometer 20 could be replaced by two resistors serving the same function in order to provide a fixed reference voltage. With the invention it is also possible to utilize a completely independent reference voltage source which is not connected to the power supply 12 instead of the potentiometer 20, although this is not preferred.

It will be noted that a line 22 extends from the wiper of the potentiometer 20. This line 22 is used to supply the reference voltage to any of the plurality of individual identical welding circuits 24 used with the invention. In FIG. 1 of the drawing only three of these welding circuits 24 are shown, but it will be understood that as many of these welding circuits 24 as may be desired for a given application may be employed.

Each of the welding circuits 24 includes a small resistor 26 serving as a means for creating a voltage drop for comparative purposes connected to the terminal 16. The term "resistor" as applied to the resistor 26 may mean a shunt structure such as a length of wire or a buss bar which will provide a voltage drop. In each of the welding circuits 24 a line 28 connects the end of the resistor 26 remote from the terminal 16 with one of the input terminals of a conventional operational amplifier 30. In each of the welding circuits 24, another line 32 connects the line 22 with the other input terminal of the operational amplifier 30 employed.

Operational amplifiers such as the operational amplifier 30 used in each of the welding circuits 24 are well known and hence are not described in detail herein. In order to amplify this disclosure, reference is made to chapter three of the text, FAIRCHILD SEMICONDUCTOR LINEAR INTEGRATED CIRCUITS APPLICATIONS HANDBOOK, by Giles, Library of Congress Catalog No. 67-27446. The entire disclosure of chapter three of this text (including the disclosures of the references cited therein) is incorporated herein by reference.

In each of the welding circuits 24 the operational amplifier 30 is connected so that its noninverting input is supplied through the line 32 and its inverting input is supplied through the line 28. In each of the welding circuits 24, the output of the operational amplifier 30 is supplied through another line 34 to what may be regarded or termed as a "transistor means" 36 so as to regulate the operation of such transistor means 36. The function of the transistor means 36 in each welding circuit 24 is to regulate the flow of current in the welding circuit 24 within which it is located during the operation of the apparatus 10. The particular transistor means 36 shown in the embodiment of the invention shown in FIG. 1 comprises a single transistor 38, the base of which is connected to the line 34 and the emitter of which is connected to the line 28 so as to receive current through this line.

The collector of this transistor 38 is connected to another line 40 containing a conventional diode 42 to an electrode 44 adapted to be used in striking an arc relative to the ground 18.

This electrode 44 is normally of conventional construction and the portion of the line 40 between it and the diode 42 is normally comparatively long and flexible so as to facilitate the use of the electrode 44. The diode 42 used is considered as solely a protective device designed to prevent the possibility of backflow of current which might otherwise damage various components of this apparatus 10.

The use of the apparatus 10 is essentially comparatively simple. When the power supply 12 is initially turned on, a voltage drop will occur at the wiper of the potentiometer 20 providing a reference voltage in the line 22 which is fed to each of the operational amplifiers 30 employed. As arcs are established by movement of the electrodes 44 relative to the ground 18 a voltage drop will occur across each of the resistors 26 which will also be detected by each of the operational amplifiers 30. Simultaneously current will be supplied to each of the transistor means 36 and the output of the operational amplifiers 30 will be fed by the lines 34 to the transistor means 36 so as to regulate the current passed by these transistors 36. If the resistance value of the resistors 26 are low, as for example, when these resistors 26 are shunt structures proper current regulation may require the insertion of other resistors (not shown) in series with the emitters of the transistors 38 between these emitters and the resistors 26. This will in turn allow current to flow to the electrodes 44 in each of the welding circuits 24 used so that arcs may be maintained between these electrodes and the ground 18.

An important facet of the present invention relates to the regulation of such current flow at each of the individual electrodes 44 so that such arcs may be simultaneously established and used with all of the power for their operation being supplied by a single power supply. In the past, it is considered that it has been practically impossible to do this. In theory it is possible to simultaneously supply power to a plurality of arcs from a single power source, controlling each arc with a transistor circuit in which the bases of the transistor used are connected directly to a reference voltage. However, as a practical matter this cannot be done since it would require relatively expensive transistor having matched performance characteristics. With the present invention, the transistor used need not have such identical characteristics because of the operation of the operational amplifiers 30 employed.

These operational amplifiers 30 operate in a conventional manner so as to compare the two different voltages applied to them in order to provide an output which controls the operation of the transistor means 36 so that such transistor means 36 regulates the current flow in each of the welding circuits 24 so that all of the electrodes 44 may be used to establish arcs in which there is equal or nearly equal current flow. Thus, in the apparatus 10 the operational amplifiers 30 perform essentially as voltage comparison means for controlling the operation of the transistor means 36. The amount of current passed by the transistor means 36 may be varied as desired through the adjustment of the potentiometer 20. Whenever such an adjustment is made the operational amplifiers 30 detect a voltage differential and provide an output which causes the transistor means 36 to change the current flow.

Figure 2:
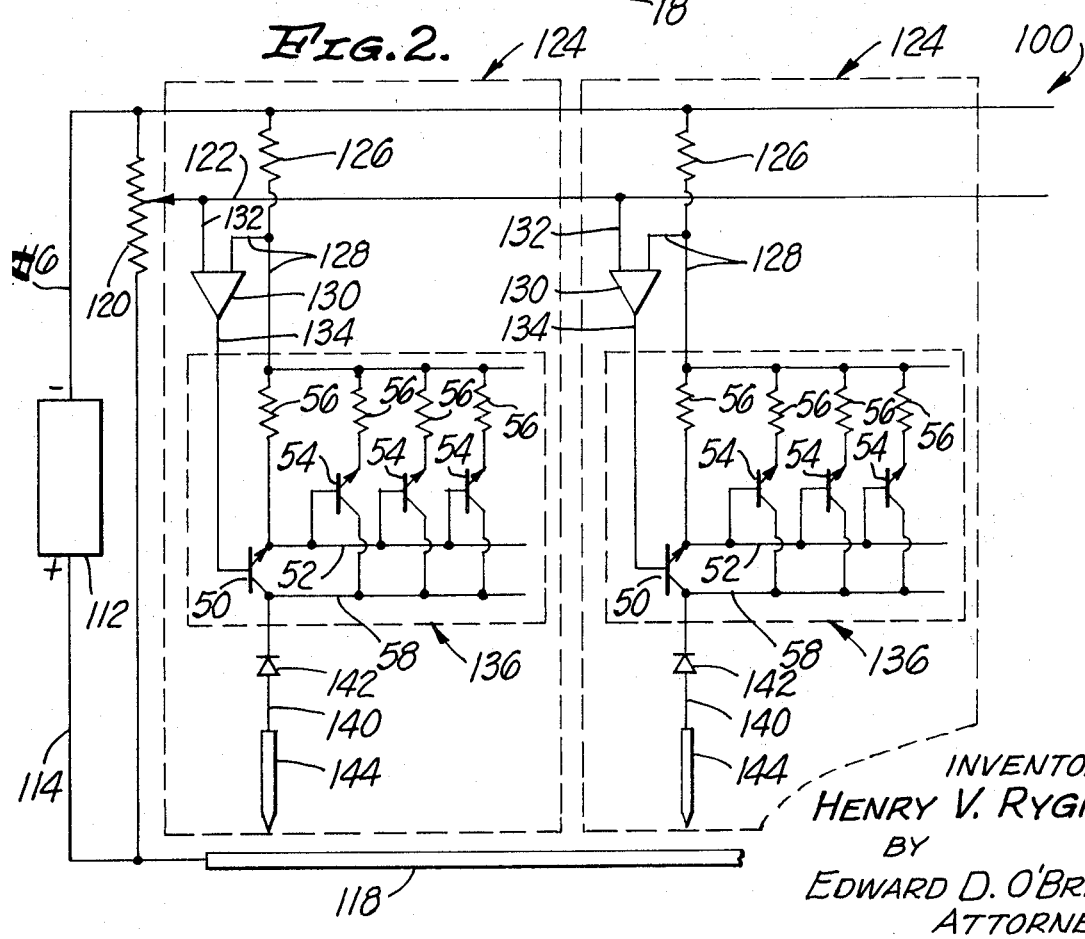
FIG. 2 is a schematic view of a presently preferred embodiment or form of a modified welding apparatus of the present invention used to supply greater amounts of current in welding at each of a plurality of different welding arcs.

While the apparatus shown in FIG. 10 may be advantageously utilized in certain applications, it will be recognized that in this apparatus 10 each of the welding circuits 24 employs only a single transistor 38. The amount of current which such a single transistor 38 is capable of passing is comparatively limited. For this reason for most applications it is considered to be advantageous to utilize a modified welding apparatus 100 as indicated in FIG. 2 of the drawing.

This modified apparatus 100 is essentially the same as the apparatus 10 previously described. For this reason various parts of the apparatus 100 which are identical or substantially identical to various parts of the apparatus 10 are not separately described herein and are indicated in the drawing and in the remainder of this specification by the numerals previously used to designate such parts preceded by the numeral 1.

In the apparatus 100 the transistor means 136 is different from the transistor means 36 previously described in order to allow for the passing of more current in the individual welding circuits 124 than in the welding circuits 24. In the apparatus 100 each of the transistor means 136 includes a control transistor 50 with its base connected directly to an operational amplifier 130 through a line 134. The emitter of this control transistor 50 is connected by means of a line 52 to the base of each power transistor 54 of a series of at least two power transistors 54. As many of these power transistors 54 may be used as necessary to supply any desired amount of welding current in the welding circuits 124.

The emitters of the transistors 50 and 54 are preferably connected to the line 128 through small balancing resistors 56 which are used in accordance with conventional practice so as to balance the internal characteristics of the various transistors 50 and 54. The collectors of the transistors 50 and 54 are all connected together by a line 58 to the line 140 used to supply power to the electrodes 144 as shown through diodes 142.

It is believed that the operation of the apparatus 100 will be obvious to one skilled in the art from a consideration of the operation of the apparatus 10. The apparatus 100 operates in the same way as the apparatus 10 as far as all of its parts are concerned except for the transistor means 136. In the transistor means 136 shown the operation of the control transistor 50 is directly governed by the operational amplifier 130 so as to in turn control the operation of the power transistor 54 so that a uniform amount of current is supplied to the electrodes 144 in each of the welding circuits 124.

It will be realized that various changes and modifications may be made in the precise circuits shown through the use and exercise of routine electronic skill. Thus, for example, known functional equivalents of operational amplifiers may be employed to serve the function of the amplifiers 30 and 130 in the apparatuses 10 and 100 described. If desired capacitors may be used in order to provide for noise suppression in accordance with conventional practice. If desired, the structures described can be modified so as to be utilized with a negative ground in welding instead of the positive ground shown through established techniques. Since the function of this specification has been to set forth a detailed description of presently preferred embodiments or forms of the invention, such changes or modifications within routine engineering skill have not been completely indicated herein.

Both of the apparatuses 10 and 100 herein described are considered to be extremely advantageous because with them a single power supply and a single control can be used to govern the operation of the plurality of welding arcs. It is not to be assumed, however, that all of the electrodes in an apparatus as described have to be used simultaneously. Either of the apparatuses described will function adequately if at the start of a welding operation no arc is struck at one or more of the electrodes in such an apparatus. Thus, although no reason is seen for it apparatuses as described can be used for single arc welding. The current control achieved with the invention is so advantageous that if desired several or more electrodes can be used simultaneously in producing a single arc. This may be advantageous when a high welding current is desired.

I claim:

1. A welding apparatus including a power supply means for supplying power having first and second terminals, ground means connected to said first terminal and circuit means for conveying current to be used in welding from said second terminal to said ground means in order to complete a current path between said terminals in which the improvement comprises:

reference means for producing a reference voltage,
said circuit means including a plurality of separate welding circuits extending in parallel with one another between said second terminal and said ground means,
each of said welding circuits including a means for creating a voltage drop, a means for regulating current flow in the welding circuit in which it is located, an electrode adapted to be used in creating an arc with respect to said ground means and a voltage comparison means for controlling the operation of said means for regulating current flow in the welding circuit within which it is located, the components within said welding circuit being connected to one another in each of said circuits so that the means for creating a voltage drop in each of said circuits is connected to said second terminal, the means for regulating current flow in each of said welding circuits is connected to the means for creating a voltage drop in such circuit on the extremity thereof remote from said second terminal and the electrode in each of said welding circuits is connected to the means for regulating current flow in the circuit in which it is located on an extremity thereof remote from the means for creating a voltage drop in such circuit, the voltage comparison means in each of said welding circuits being connected to said reference means and to the means for regulating current flow in the welding circuit in which it is located and to the connection between the means for creating a voltage drop and the means for regulating current flow in the welding circuit within which it is located, said voltage comparison means being operative to regulate current flow in the welding circuits within which they are located in accordance with the voltages at said reference means and at the connections between said means for creating a voltage drop and the means for regulating current flow in the welding circuits in which they are located.

2. A welding apparatus as claimed in claim 1 wherein:
said reference means is adjustable so that said reference voltage may be changed so as to vary the current in said welding circuits.

3. A welding apparatus as claimed in claim 1 wherein:
said reference means is a potentiometer, the ends of which are connected across said first and second terminals.

4. A welding apparatus as claimed in claim 1 wherein:
each of said means for creating a voltage drop is a resistor.

5. A welding apparatus as claimed in claim 1 wherein:
each of said means for regulating current flow comprises a transistor means.

6. A welding apparatus as claimed in claim 5 wherein:
the transistor means within each of said welding circuits is a single transistor.

7. A welding apparatus as claimed in claim 5 wherein:
the transistor means within each of said welding circuits includes a control transistor connected to the voltage comparison means within such circuit and a plurality of individual transistors connected to said control transistor so as to be operated thereby.

8. A welding apparatus as claimed in claim 1 in which:
each of said voltage comparison means is an operational amplifier.

9. A welding apparatus as claimed in claim 1 wherein:
said reference means is a potentiometer, the ends of which are connected across said first and second terminals,
each of said means for creating a voltage drop is a resistor,
each of said means for regulating current flow comprises a transistor means,
each of said voltage comparison means is an operational amplifier.

10. A welding apparatus as claimed in claim 9 wherein:
the transistor means within each of said welding circuits is a single transistor.

11. A welding apparatus as claimed in claim 9 wherein:
the transistor means within each of said welding circuits includes a control transistor connected to the voltage comparison means within such circuit and a plurality of individual transistors connected to said control transistor so as to be operated thereby.

12. A welding apparatus as claimed in claim 9 including:
diode means for preventing reverse current flow located in each of said welding circuits.

13. A method of simultaneously operating a plurality of separate welding circuits connected in parallel between a first and second terminal of a single power supply comprising:
connecting a ground means to the first terminal of the power supply,
interconnecting in each of the welding circuits one end of a means for creating a voltage drop to the second terminal of the power source, the other end of said means for creating a voltage drop to one end of a means for regulating current flow, the other end of said means for regulating current flow to an arc welding electrode,
simultaneously powering each of said electrodes from the single power supply through each separate welding circuit while controlling the current in each of said welding circuits with the means for regulating current flow by comparing the voltage across said means for creating a voltage drop with a reference voltage used for all of said welding circuits.

14. A method as claimed in claim 13 wherein:
the current in each of said welding circuits is controlled by an operational amplifier in each of said welding circuits, all of said operational amplifier being connected to said reference voltage.

* * * * *